United States Patent
Stevens et al.

(10) Patent No.: US 6,924,904 B2
(45) Date of Patent: Aug. 2, 2005

(54) METHODS AND SYSTEMS FOR ELECTRONICALLY GATHERING AND ORGANIZING PRINTABLE INFORMATION

(75) Inventors: Mark Liu Stevens, Orange, CA (US); Larry Lee Feldman, San Pedro, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 898 days.

(21) Appl. No.: 09/789,413

(22) Filed: Feb. 20, 2001

(65) Prior Publication Data

US 2002/0114009 A1 Aug. 22, 2002

(51) Int. Cl.⁷ .............................................. G06F 15/00
(52) U.S. Cl. ...................... 358/1.18; 358/403; 358/458
(58) Field of Search ............................. 358/1.18, 403, 358/458; 382/305

(56) References Cited

U.S. PATENT DOCUMENTS 5,715,381 A   2/1998  Hamilton .................... 395/114
6,040,920 A * 3/2000  Ichiriki ....................... 358/403

FOREIGN PATENT DOCUMENTS

JP              10091805         4/1998

* cited by examiner

Primary Examiner—Twyler Lamb
(74) Attorney, Agent, or Firm—David C. Ripma; Joseph C. Curtin

(57) ABSTRACT

Embodiments of the present invention relate to methods and systems for manipulating and combining files from different applications without the use of the files' originating applications. Application files are collected and converted to a page-format which preserves the visual aspects and page formatting of the application file. A composer application is then used to manipulate and reorganize the pages of the files as needed. Pages from files created by different applications may be compiled into a single document which can be printed or electronically transmitted without manual editing or delivery.

21 Claims, 4 Drawing Sheets

METHODS AND SYSTEMS FOR ELECTRONICALLY GATHERING AND ORGANIZING PRINTABLE INFORMATION

THE FIELD OF THE INVENTION

Embodiments of the present invention relate to methods and systems for gathering and organizing printable information into a single-source electronic format. Output from myriad applications may be captured as printer output and converted to the format of embodiments of the present invention for further compilation, organization and editing as a single document. The final document may then be output to a printer, e-mailed, faxed or otherwise transmitted in hard copy or electronic form.

BACKGROUND

Integration of computer software has advanced significantly to the point where complex multimedia presentations may be produced with only a few applications. However, the needs of users are diverse and no application has evolved that is ideal for all users in all situations. Consequently, the production of presentations and complex documents generally involves the use of a plurality of applications which are particularly suited to particular elements of a document or presentation. A plethora of file formats also exist which can complicate the integration of information into a single unit and force a presentation organizer to utilize multiple applications to create partial presentations which are organized and compiled manually.

Using current presentation and document preparation applications, a user needs to produce printed packets of information coming from several different sources. Typically, hard copy output from each application is manually assembled into a master hard copy of a final packet. Various files are printed and assembled. Pictures, photographs and other graphical information may need to be manually cut and pasted into other documents. Once the packet is organized, page numbering, indices, tables of contents, title pages and other elements may need to be generated and tediously compiled with the packet elements. If the original source of each element is to be documented, it may need to be manually annotated further complicating the process.

Once the packet is fully compiled, it will exist only in hard copy form. Copies will need to be made for each recipient and, if not re-converted to an electronic format, will need to be distributed through a time-consuming and expensive manual process such as traditional mail or courier services. If faster distribution is desired, a user may fax the document or scan the document thereby converting the document back to an electronic format which may be e-mailed or otherwise distributed electronically. While this conversion back to an electronic format enables quick electronic distribution, the electronic format is typically not compatible with any of the original document preparation applications and may not be electronically edited without tedious conversion processes which often lose formatting and other important document elements.

Conversion to a fax format for distribution also suffers from poor resolution. Fax quality is generally much poorer than what you can get with a standard printer driver. Printers can routinely do 600 dots per inch, whereas a fax is, at best, on the order of 150 to 200 dpi. Even on a good resolution monitor (i.e., 1600×1200), the dots per inch is still on the order of 100 to 150 (although color content is much richer). The ability to print and view without losing detail, color content and quality is a big advantage over faxing.

SUMMARY AND OBJECTS OF THE INVENTION

Embodiments of the present invention provide systems and methods for electronically compiling, organizing and annotating documents from varying applications and formats into a single document.

In preferred embodiments of the present invention virtual printouts are used to gather information from applications. Rather than printing multiple documents and pages and manually assembling the elements, virtual pages are gathered into a single composer program. As pages are collected from various applications, they may be visually represented on a display desktop as miniature images of the actual printed page that would result from a typical printing process. Once pages have been collected by the composer program, they may be organized, annotated, deleted or otherwise arranged or edited to form one or more compound documents through manipulation of the miniature images on the display. Known drag-and-drop techniques may be employed in some embodiments.

When a user has hard copy documents to be compiled with other documents, the hard copy documents may be scanned into a digital format and imported into the composer program. Documents may be opened by the Composer program or may be read into an application and converted to virtual pages. Once these pages have been collected into the composer program, they may be manipulated in the same manner as those collected from applications.

Some embodiments of the present invention allow a user to collect document pages by dragging an application source file onto a composer program icon. In these embodiments, the application program may be automatically started and its print process invoked. Output which would typically result in printer output is converted to virtual pages and collected into the composer program. For example, if a user wishes to create a document comprising a Microsoft® Word file, a JPEG image file and a MathCad® file; the user may simply drag the icons which represent each file onto the composer program icon. This action will result in each page of each file being converted to a virtual page represented on the composer program desktop. Alternatively, a user may start each application separately and direct printer output to the composer program where the files may be combined and arranged.

Embodiments of the present invention may further track the source file from which each page has been derived so that the origin of each page may be preserved for purposes of accreditation, attribution or other reasons. Each page may be automatically tagged with source information to display this record. Additionally, a compound file identifier may also be added to a page to reflect the identity of the new file created in the composer program.

Page numbering may also be added to a compound file to annotate the order of the newly created compilation. This numbering may be in addition to page numbering which existed in the original document files. Original numbering may be preserved and the new numbering may be formatted to distinguish between the two systems. Alternatively, original numbering may be edited out to avoid repetition and confusion.

When a user has completed a compound document using an embodiment of the present invention, the entire document may be printed directly from the composer program and multiple copies may be generated at the printer. The document will be printed in final form and may be automatically collated and stapled at the printer if desired. This feature allows a user to avoid the tedious and time-consuming task of manually combining several documents into one packet.

A user may also elect to send a completed compound document directly to a recipient through e-mail, FTP or another electronic delivery method. The completed file may be transferred as one unit without multiple attachments. A user may send a file created with an embodiment of the present invention to another user with a compatible program. The recipient may then open the file with his composer program and view or print the file as needed. Alternatively, embodiments of the present invention may comprise conversion capability for converting the compound document file into another file format. Preferred embodiments provide a means for converting files into a PDF file format established for use with Adobe Acrobat®. Adobe distributes a read-only Acrobat Reader as freeware. Consequently, PDF compatible readers are ubiquitous and free. Other file formats are also within the scope of embodiments of the present invention. This file conversion feature allows a user to send files to others who do not have a version of the present invention.

Some embodiments of the present invention also comprise a library of inserts that may be used to organize and enhance files. Pre-formatted inserts may be dragged and dropped into a file at locations designated by the user. Some customization of inserts is allowed in embodiments of the present invention.

Watermarks may also be placed on pages to designate file origin, confidential status or any other information. Watermarks may be placed on all pages reflecting the same information or unique watermarks may be placed on each page or group of pages.

Embodiments of the present invention allow a user to completely compile compound documents with elements originating from multiple source programs without generating intermediate hard copy versions and without manual collation and organization. All steps of compound document generation may be accomplished within the processes of these embodiments allowing a user to avoid unnecessary trips to scanners, copiers, printers and other devices thereby saving time and resources.

Accordingly, it is an object of some embodiments of the present invention to provide systems and methods for combining documents from multiple source applications.

It is another object of some embodiments of the present invention to provide systems and methods for organizing documents from multiple source applications.

It is a further object of some embodiments of the present invention to provide systems and methods for transferring documents from multiple source applications.

These and other objects and features of the present invention will become more fully apparent from the following, description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the system and apparatus of the present invention, as represented in FIGS. 1 through 5 is not intended to limit the scope of the invention, as claimed, but it is merely representative of the presently preferred embodiments of the invention.

The currently preferred embodiments of the present invention will be best understood by reference to the drawings, wherein like parts are designated by like numerals throughout.

Embodiments of the present invention may be used with myriad computer applications to combine and enhance application files which are otherwise incompatible. Documents created in various applications such as spreadsheets, word processors, databases, graphics applications, browsers and others may be combined and integrated into a single electronic document that may be printed to hard copy or electronically transmitted to any number of recipients.

Figure 1:
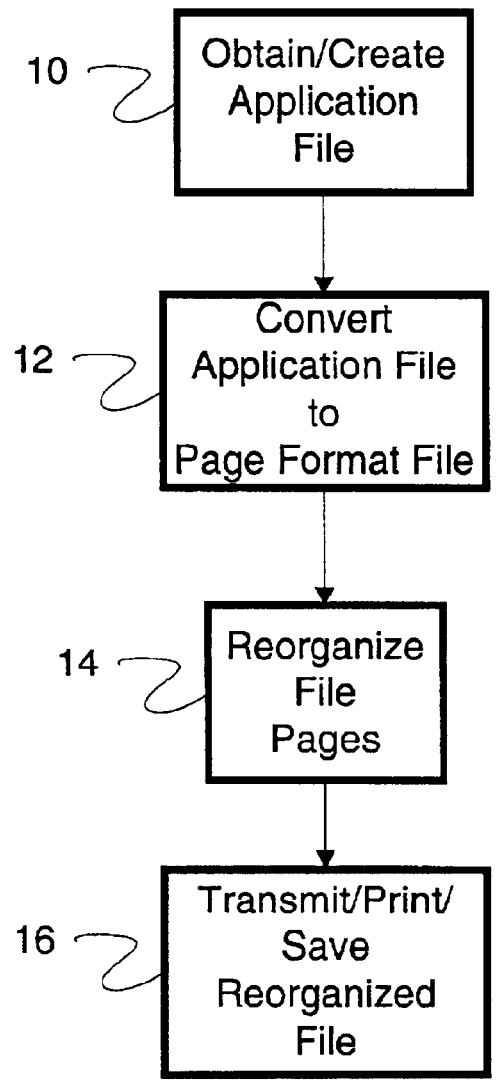
FIG. 1 is a flowchart showing the functions of an embodiment of the present invention.

In reference to FIG. 1, a user of an embodiment of the present invention may begin its use by creating an application file 10 using a standard application program such as a word processor or other application. A user may also receive this application file 10 from another party who has created it. Regardless of the source, the application file is converted 12 to a device-independent, "page-format" file which retains the appearance of each page of the application file as it would appear if printed. This conversion process 12 may be effectuated using a proprietary application which reads the application file and converts it to a page-format file. However, preferred embodiments of the present invention invoke the originating application used to create the application file and cause that originating application to direct printer output to an inventive device driver which records the printer output as a device-independent, page-format file.

When an application file has been converted 12, each page of the converted file may be displayed to a user for reorganization. In a preferred embodiment, each page is displayed as a reduced-size image or thumbnail of the actual page as it would appear when printed. Some embodiments may display each page as an icon which identifies the page content in other ways, such as by page number or some other indicia. These thumbnails or icons may be arranged on a display in the order in which they would be printed or otherwise transmitted. Pages may be reorganized 14 by selecting one or more page icons and designating a reorganization function using a graphical user interface. Reorganization functions may comprise deletion, reordering, annotation and other functions. Typically, reorganization will comprise deletion of unwanted pages and reordering of remaining pages.

A user may also employ embodiments of the present invention without reorganizing 14 the file. This may occur when a user simply wishes to convert the file to a device-independent, page-format for transmission to recipients who do not have the application which was used to create the original application file. In this manner, recipients who have computers with minimal or limited resources may use embodiments of the present invention to read and print converted page-format files without installing the applications originally used to create the application files. Accordingly, low-resource computers can be used to receive, view and print files which were originally created with applications which require higher-resource computers if the files are created 10 using an application and converted 12 on a single high-resource computer after which they are transmitted 16 to multiple low-resource computers which employ embodiments of the present invention to read the converted file. These converted, page-format files may be transmitted electronically, viewed on a display, saved as a file or printed out as hard copy 16 as well as other uses.

Figure 2:
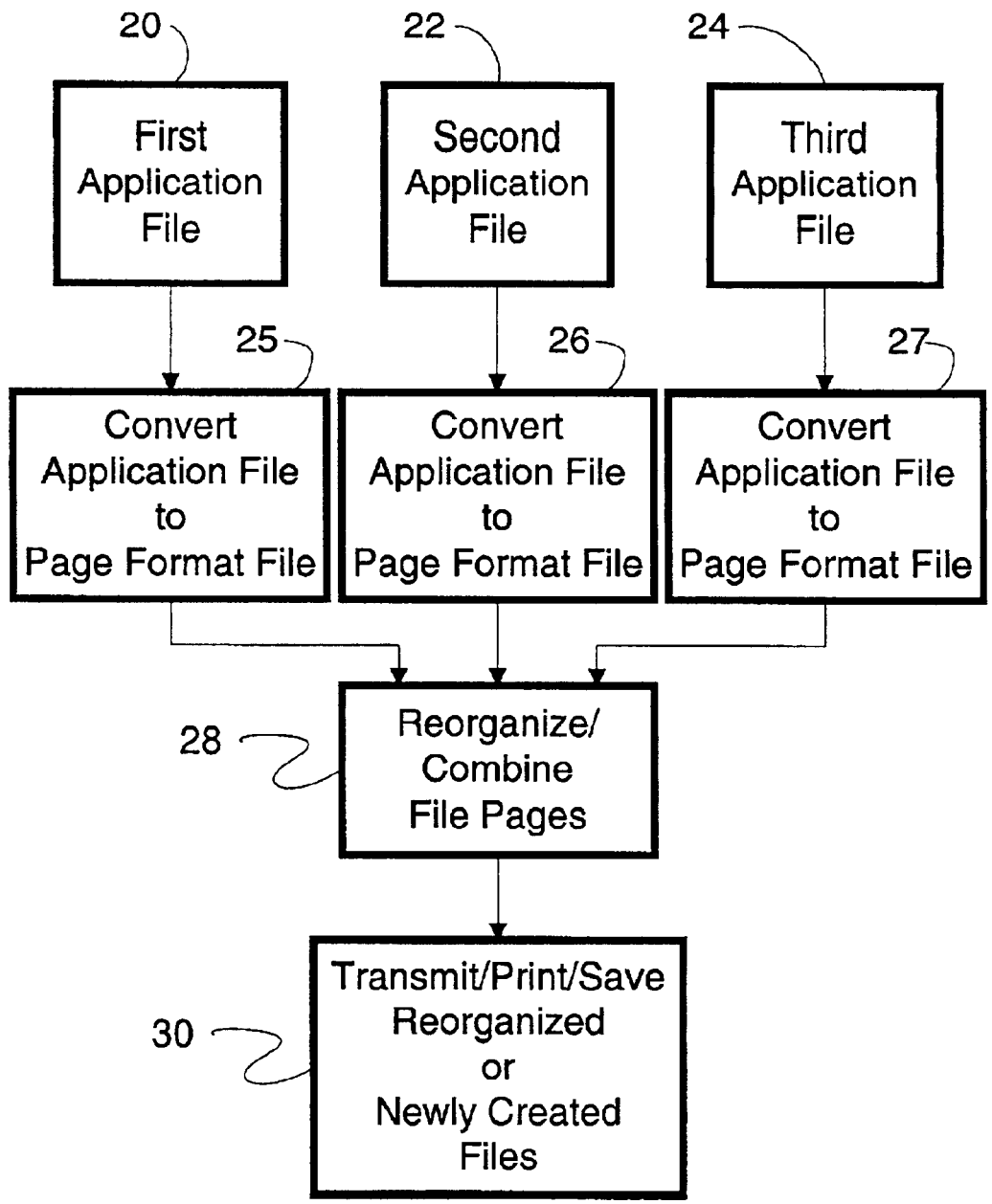
FIG. 2 is a flowchart showing the functions of an embodiment of the present invention used with multiple applications.

As shown in FIG. 2, embodiments of the present invention may accept files from a plurality of originating applications and convert them to a common format wherein they may be combined and reorganized. A first application file or document 20 may be created using one of myriad applications, for example and not by way of limitation, first application file 20 may be a word processing document. After first application file 20 is created or selected, it is converted 25 to a page-format file which preserves the appearance of each page of the application file 20 from which it was converted as that file would have been printed. Once the application file is converted, each page of the file may be displayed to a user. For example, an icon representing each page of application file 20 may be displayed on a graphical user interface (GUI) desktop, window or some other display format.

A second application file 22 may also be created using a second application. For example and not by way of limitation, second application file 22 may be created using a graphics application with a proprietary file format. Second application file 22 may also be converted 26 to a page-format file in a process similar to that used with first file 20. Each page of Second application file 22 may also be displayed to a user on a GUI desktop, window or in some other format.

Similar to first application file 20 and second application file 22, a third application file 24 may be obtained with a third application such as a browser which can be used to record or capture and view files with varying formats. For example and not by way of limitation, a browser may be used to obtain files in HTML, GIF, JPEG and other formats typically found on the world wide web (WWW), local intranets or other locations. Once these files have been obtained or loaded into the browser, they may be converted to a page-format file 27 and displayed to a user on a GUI desktop, window, pane or in some other format which allows distinction between file pages.

Once files have been converted and displayed in a format which allows a user to distinguish between and select from the pages of each file. A user may select specific file pages for reorganization 28. Reorganization may comprise creation, deletion, reordering, combining, recombining, copying, cutting, pasting and other functions. For example and not by way of limitation, a file may be created by copying one or more pages from an existing file to create a new file. Specific pages may be selected for deletion. Pages may also be selected from one file and combined with another file. In this manner the converted files resulting from conversion of first application file 20, second application file 22 and third application file 24 may be combined and reordered in any combination or order.

When a user has reorganized one or more files the resulting files may be transmitted, printed, saved 30 or otherwise manipulated as needed for recordation or communication.

Figure 3:
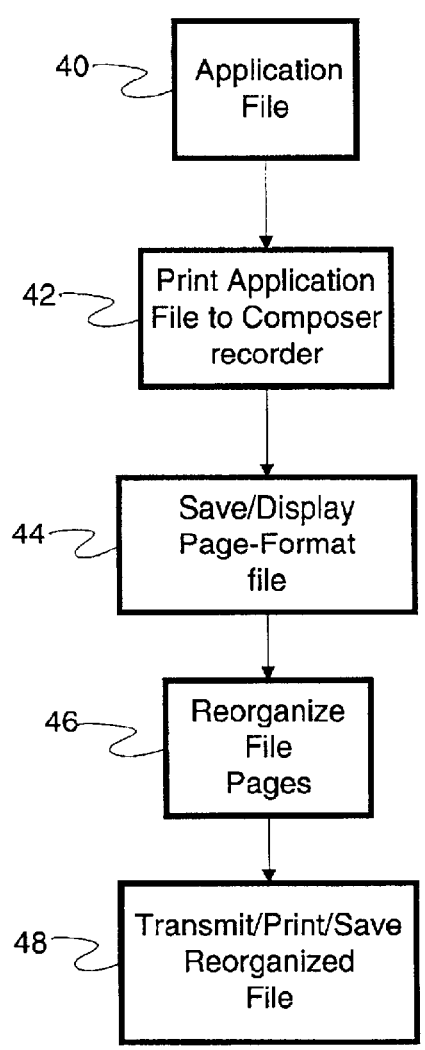
FIG. 3 is a flowchart showing the functions of an embodiment of the present invention.

In some preferred embodiments of the present invention which work in conjunction with Microsoft Windows 95, 98, NT, Windows ME and Windows 2000 operating systems, an application file 40 may be created or opened using an application as shown in FIG. 3. While using the application, a user may select the inventive driver and other elements of embodiments of the present invention as the equivalent of a printer. This printer equivalent, known as the Composer Recorder (CR), comprises a driver and other software which function to intercept output otherwise destined for a printer. The CR redirects that data for use and display to a user who may wish to reorganize the data or combine it with data from other applications which may or may not be compatible with the original application format of the data.

Once the CR has been selected, a user may "print" 42 the application file to the Recorder which creates a page-format file 44 comprising each page of the application file as it would have appeared if printed to a normal printer. Currently preferred embodiments employ a Windows enhanced metafile (EMF) format for transfer of graphical information. Multiple files from different applications may be "printed" or converted in this manner. For example, second application file 50 may be "printed" 43 and saved 45 as a page-format file which may be combined with other page-format files such as that obtained through conversion of file 40.

Using another element of embodiments of the present invention, sometimes called the Composer application, the page-format file may be displayed to a user using a GUI desktop, window or other display format in which each page of the file is displayed to the user for selection and reorganization. The Composer application may be used to combine and reorganize 46 page-format files as needed by a user after which the files may be transmitted, printed, saved or otherwise manipulated 48.

Embodiments of the present invention which operate in conjunction with Microsoft Windows 95, 98, NT, ME and 2000 may utilize the standard family system capabilities in these operating systems. Standard system capabilities comprise deployment of an application in a window, drag-and-drop Windows constructs including disk files and pages of page-format files in application windows and/or panes, and using the standard Windows interface between the GDI monitor display and the print spooler to create a device-independent EMF print file.

Figure 4:
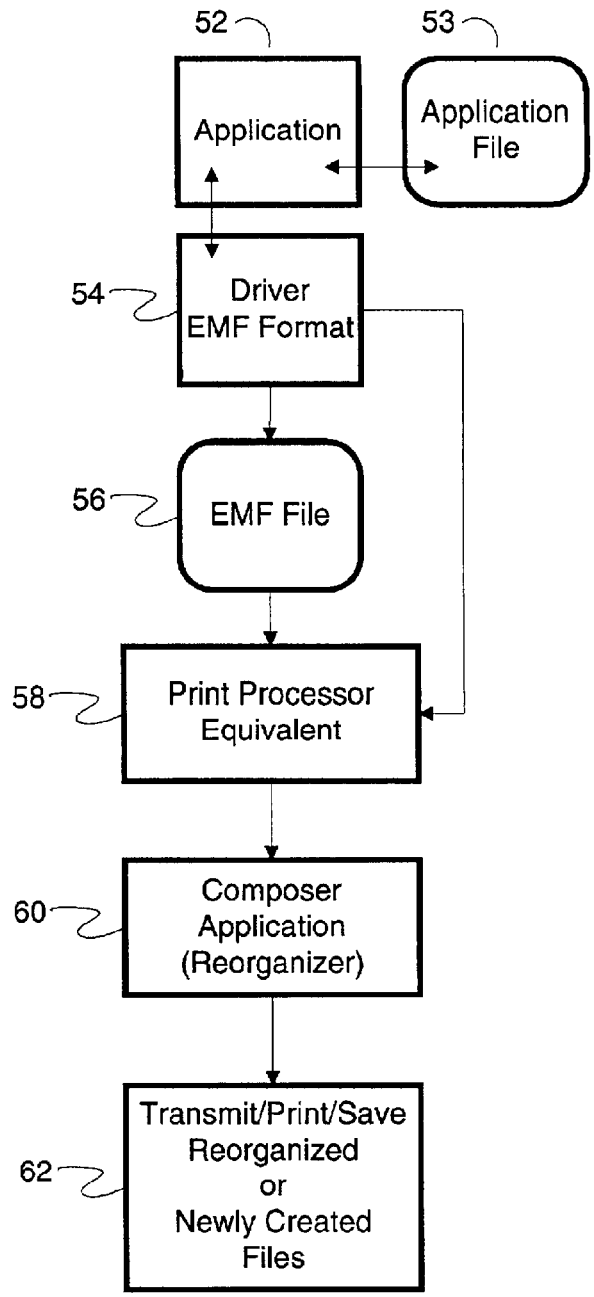
FIG. 4 is a diagram showing the functions and interaction between elements of an embodiment of the present invention using an EMF file format.

In some embodiments of the present invention, as shown in FIG. 4, an application file 53 currently active in an application 52 may be "printed" to an embodiment of the Composer Recorder which employs a driver 54 using an EMF file format. This driver 54 creates an EMF file 56 by sequestering GDI informational calls from application printer output and storing GDI drawing calls in a device-independent EMF file 56 comprising information representing each page of application file 53 as it would appear if printed to a typical printer. This process yields an EMF file 56 similar to a spool data file that is substantially device independent. EMF file 56 may be described as a page-format file because it retains the format of each page of application file 53 as it would appear if printed. During this phase, files may also be compressed so that the composite document does not take up as much space. Compression can generally improve performance for end-users, particularly on low-end machines.

Rather than creating print data and passing it to a typical printer, Composer application 60 is opened in a window and the EMF file print stream is passed to the active Composer application 60. Once EMF file 56 has been created, driver 54 passes 55 the file name of EMF file 56 to the equivalent of a print processor 58 which plays EMF file 56 to Composer application 60 to allow display and reorganization of specific file pages. Intermediary applications may be used to pass files between these drivers, applications, processors or other entities and to launch other applications or otherwise coordinate data transfer and entity activation.

In some embodiments, Composer application 60 may create reduced images of file pages for display as icons which may be used to manipulate actual file pages in a GUI or similar environment.

Alternative embodiments of the present invention may utilize other file formats in lieu of the Windows EMF format. For example, a PDF format may be used to achieve the same end. Other operating systems, such as UNIX, Macintosh OS and others, may also employ other data formats for printer data, including printer spool files which perform satisfactorily in embodiments of the present invention.

Once EMF files 56 have been read and reorganized or otherwise manipulated they may be printed, electronically transmitted, stored or otherwise conveyed or recorded 62. Embodiments of Composer application 60 may also store files in a proprietary composer format 61 or may convert and store files in other known formats such as PDF 63 for transmission and reuse.

Figure 5:
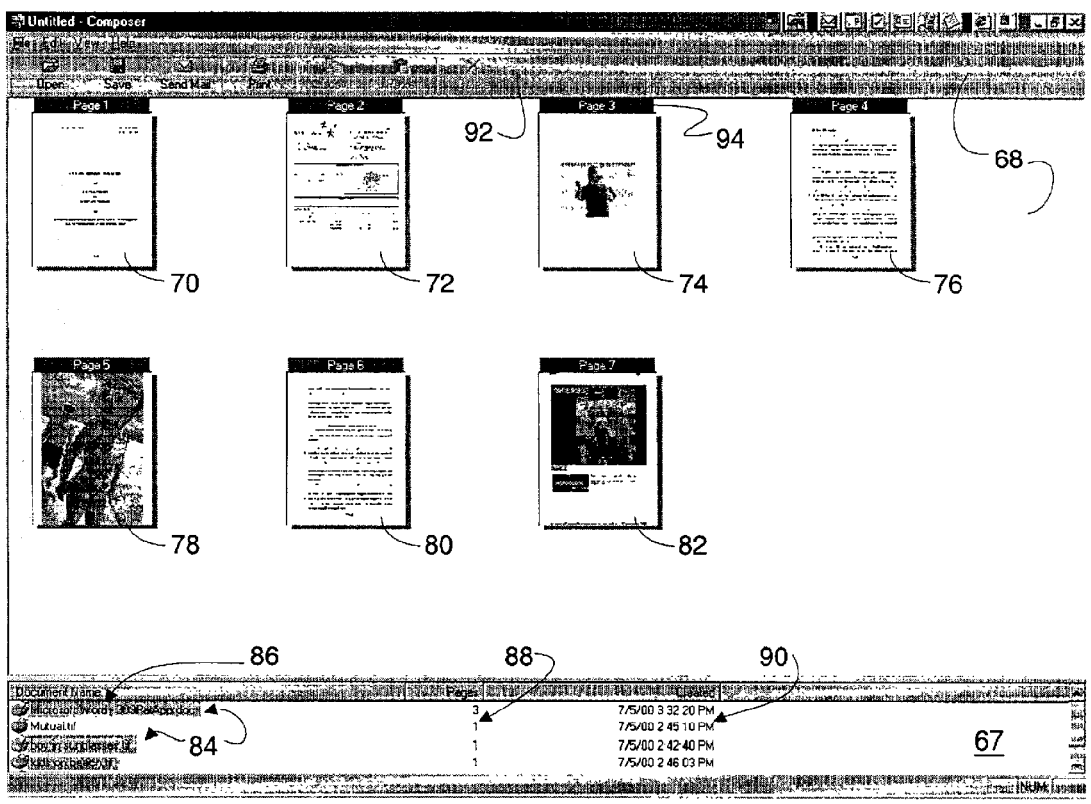
FIG. 5 shows a typical GUI window and interface used to operate an embodiment of the present invention.

In reference to FIG. 5, an exemplary embodiment of a GUI display of a Composer application 60 is shown. In an embodiment running in a Microsoft Windows environment, as shown, a Composer application 60 may run in a window 66 which may comprise multiple panes 67 and 68. Alternative embodiments may have different window configurations. Window 66 may also comprise toolbar 92 or other icons or elements for enabling functions of the application.

In this exemplary embodiment, first pane 68 displays icons 70,72,74,76,78,80 and 82 which represent pages of application files which have been input into Composer application 60 using Composer recorder 42. This may be achieved by dragging application file icons (not shown) onto a Composer application icon (not shown) which may appear in a separate window or desktop thereby activating the various originating applications and "printing" the application files to a Composer driver 54 which directs the pages of the application files 40 and 50 to the Composer application 60 as described above. Alternatively, each application may be initiated by a user who thereafter selects the Composer recorder driver 54 and "prints" the application file to Composer application 60 thereby populating window pane 68 with icons 70, 72, 74, 76, 78, 80 and 82 representing pages of the application files such as 40 and 50. Alternatively, a user may input pages into Composer application 60 by dragging a source file over an open work area, such as a window pane 68 or 67 in the Composer application 60. This action may be configured to trigger the launch of the owning application and subsequent printing into Composer of its pages.

Typically, window pane 68 will comprise icons which represent pages of multiple applications. In this specific example, icons 70, 76 and 80 represent pages of a word processor file which has been input into Composer application 60. Icons 74 and 78 are pages from a graphical application which has produced image files such as digital photographs. Icon 72 may represent a page from a spreadsheet application including graphs and other information. Icon 82 may represent a page from a website on the Internet which has been "printed" from a browser application. As these files are input into Composer application 60 their various pages appear in window pane 68 where they may be selected for reorganization.

As in other GUI applications, a user may select each of icons 70, 72, 74, 76, 78, 80 and 82 for reorganization functions using common dragging, dropping and selection methods with typical input devices. Composer files may be saved to preserve the page configuration displayed in pane 68. Pages may be reordered simply be dragging a page icon from one position in a page order to another. Page order and numbering may be displayed using a page number tab 94 on each page icon which communicates the page order of each page. As a non-limiting example, icon 82 may be dragged to a position in window 68 between icon 74, representing page 3 of the display arrangement, and icon 76, representing page 4 of the display arrangement, and dropped at that position. This action will cause icon 82 to become page 4 of the display arrangement and icons 76, 78 and 80 to increment to the next highest page number in the order. Other pages may be manipulated and reordered in a similar fashion.

In preferred embodiments, page icons 70,72,74,76,78,80 and 82 will be displayed as reduced images of the actual pages they represent. Reduced images or thumbnails accurately depict the appearance of the pages they represent as the pages would print from the originating application file, but the size of the image is reduced for convenient manipulation with a pointing device.

Some embodiments may also comprise second window pane 67 in which originating application file information is displayed. Pane 67 may comprise a list of files 86 which have been input into Composer application 60 and for which page icons exist in pane 68. Pane 67 may further comprise page count list 88 which communicates the number of pages each originating application file contains. Pane 67 may further comprise file creation data list 90 which communicates the time and date when the information from the originating application was copied into the Composer file, the date and time when the originating application file was created or other significant dates and times.

As each page icon is selected in pane 68, the corresponding originating application file in list 86 is highlighted 84 to communicate the application file associated with each page. This method may be used to preserve an association between the originating file and the pages of a combined or reorganized file in Composer application 60.

As many documents require inserts for section delineation and organization, embodiments of the present invention may comprise libraries of pre-formatted insert pages which may be selected and added into files in a manner similar to page reorganization. Custom libraries may also be created with title pages, cover sheets and other elements which are commonly used.

Some embodiments of the present invention may also comprise watermarks which may be added to file pages to reflect page or document status, origin or some other characteristic. Pre-formatted watermarks for communicating confidentiality or other status may be selected for any page or file.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for electronically manipulating output from at least one computer applications without the use of said application, said method comprising:
    (a) collecting a first application file created with a first application in a format which retains the appearance of each page of said first file as it would be printed from said first application; and
    (b) reorganizing the pages of said first application file in said format without said first application.

2. The method of claim 1 wherein said reorganizing is performed through manipulation of a graphical representation of each page of said first application file, said representation being displayed for selection with an input device.

3. The method of claim 1 wherein said reorganizing comprises deletion of at least one page.

4. The method of claim 1 wherein said reorganizing comprises reordering at least one page.

5. A method for electronically combining files from differing applications, said method comprising:
    collecting a first file from a first application in a format which preserves each page of said first file as it would be printed from said first application;
    collecting a second file from a second application in a format which preserves each page of said second file as it would be printed from said second application; and
    combining said first file and said second file into a compound file without the use of said first application and said second application.

6. The method of claim 5 wherein said compound file comprises pages which may be reorganized.

7. The method of claim 5 wherein said compound file is automatically paginated as it is combined and reorganized).

8. The method of claim 5 wherein said compound file comprises pages originating from said first file and pages originating from said second file and wherein each page is tagged to designate the file from which it originated.

9. A method for electronically combining and manipulating files from differing applications, said method comprising:
    collecting a first file from a first application in a format which preserves each page of said first file as it would be printed from said first application;
    displaying said first file with a user interface with a first graphical representation which allows a user to select and manipulate each page of said first file;
    collecting a second file from a second application in a format which preserves each page of said second file as it would be printed from said second application; and
    displaying said second file with said user interface as a second graphical representation which allows a user to select and manipulate each page of said second file; and
    allowing said first file and said second file to be modified by selection of pages on said graphical representation.

10. The method of claim 9 further comprising allowing a third file to be created by selection of pages from said graphical representations, said third file comprising pages from said selection.

11. A method for electronically combining and manipulating files from differing applications, said method comprising:
    creating a first application format file in a first application;
    converting said first application format file to a first EMF file; and
    modifying said EMF file structure in response to user input without the use of said first application.

12. The method of claim 11 wherein said modifying said EMF file in response to user input comprises displaying said first EMF file on a display as a graphical representation of each page of said EMF file and modifying said EMF file according to user manipulation of said graphical representation of each page.

13. The method of claim 11 wherein said modifying comprises reordering pages, deleting pages and combining pages from different files.

14. A system for electronically manipulating files independent of their originating application, said system comprising:
    a computing device capable of running a plurality of applications comprising:
        a display,
        an input device,
        a processor, and
        a memory capable of storing applications and files;
    said computing device being capable of:
        collecting a first file from a first application in a format which preserves each page of said first file as it would be printed from said first; and
        manipulating a page in said first file according to input from said input device thereby creating a modified file.

15. The system of claim 14 wherein said manipulating comprises reordering pages, deleting pages and combining pages from different files without the use of said first application.

16. The system of claim 14 wherein said computing device is further capable of collecting a second file from a second application in a format which preserves each page of said second file as it would be printed from said second application and said manipulating further comprises combining said first file and said second file into a compound file without the use of said first application and said second application.

17. A method for electronically reorganizing a files, said method comprising steps for:
    obtaining application file data with an application;
    sending said application file data to a driver;
    creating a page-format file with said driver;
    displaying icons representing each page of said page-format file to a user;
    allowing reorganization of pages of said page-format file without the use of said application.

18. The method of claim 17 wherein said page-format file is an EMF file.

19. A system for electronically manipulating files independent of their originating application, said system comprising:
- means for computing, said means being capable of running a plurality of applications, said means for computing comprising:
  - means for displaying,
  - means for input,
  - means for processing, and
  - means for storing applications and files;
- means for collecting a first file from a first application in a format which preserves each page of said first file as it would be printed from said first application; and
- means for manipulating a page in said first file according to input from said input device thereby creating a modified file.

20. Computer readable medium comprising instructions for a method of electronically combining and manipulating files from differing applications, said method comprising instructions for:
- collecting a first file from a first application in a format which preserves each page of said first file as it would be printed from said first application;
- displaying said first file on a user interface with a first graphical representation which allows a user to select and manipulate a page of said first file;
- collecting a second file from a second application in a format which preserves each page of said second file as it would be printed from said second application; and
- displaying said second file on said user interface with a second graphical representation which allows a user to select and manipulate a page of said second file; and
- allowing said first file and said second file to be modified by selection of pages on said graphical representation thereby creating a modified file.

21. A computer data signal embodied in an electronic transmission, said signal having the function of electronically combining and manipulating files from differing applications using a method comprising:
- collecting a first file from a first application in a format which preserves each page of said first file as it would be printed from said first application;
- displaying said first file on a user interface desktop with a first graphical representation which allows a user to select and manipulate a page of said first file;
- collecting a second file from a second application in a format which preserves each page of said second file as it would be printed from said second application; and
- displaying said second file on said user interface desktop with a second graphical representation which allows a user to select and manipulate a page of said second file; and
- allowing said first file and said second file to be modified by selection of pages on said graphical representation thereby creating a modified file.

* * * * *